US012265348B2

(12) United States Patent
Sato

(10) Patent No.: US 12,265,348 B2
(45) Date of Patent: Apr. 1, 2025

(54) IMAGE FORMING APPARATUS WITH ROTARY BODY HAVING BACKGROUND PORTION AND CLEANING PORTION

(71) Applicant: KYOCERA Document Solutions Inc., Osaka (JP)

(72) Inventor: Takehiro Sato, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/487,875

(22) Filed: Oct. 16, 2023

(65) Prior Publication Data

US 2024/0126199 A1 Apr. 18, 2024

(30) Foreign Application Priority Data

Oct. 17, 2022 (JP) ................................ 2022-166470

(51) Int. Cl.
*G03G 15/00* (2006.01)

(52) U.S. Cl.
CPC ..... *G03G 15/5041* (2013.01); *G03G 15/5004* (2013.01); *G03G 2215/00679* (2013.01); *G03G 2215/00759* (2013.01)

(58) Field of Classification Search
USPC ........................................................... 399/49
See application file for complete search history.

(56) References Cited

U.S. PATENT DOCUMENTS

2004/0234286 A1* 11/2004 Takahashi .......... G03G 15/5041 399/53
2006/0228124 A1* 10/2006 Igarashi ............. G03G 15/0194 399/49

FOREIGN PATENT DOCUMENTS

JP 2018111582 A 7/2018

* cited by examiner

*Primary Examiner* — Quana Grainger
(74) *Attorney, Agent, or Firm* — Alleman Hall & Tuttle LLP

(57) ABSTRACT

The image forming apparatus transfers an image onto a surface of a sheet at a transfer position on a conveying path. A pair of conveying rollers convey the sheet to the transfer position. The image sensor reads the sheet upstream of the transfer position. The rotary body is disposed to face the image sensor with the conveying path interposed therebetween. The rotary body includes a background portion configured to face a reading surface of the image sensor when the rotary body is at a first rotational position, and a cleaning portion configured to come into contact with the reading surface of the image sensor when the rotary body is at a second rotational position.

5 Claims, 7 Drawing Sheets

IMAGE FORMING APPARATUS WITH ROTARY BODY HAVING BACKGROUND PORTION AND CLEANING PORTION

INCORPORATION BY REFERENCE

This application is based upon and claims the benefit of priority from the corresponding Japanese Patent Application No. 2022-166470 filed on Oct. 17, 2022, the entire contents of which are incorporated herein by reference.

BACKGROUND

The present disclosure relates to an image forming apparatus.

In an image forming apparatus, it is known that a registration unit is installed in the middle of a sheet conveying path. The registration unit includes a pair of registration rollers provided on the conveying path. The registration unit further includes an image sensor for detecting skew or lateral displacement of the sheet.

The registration unit is installed upstream of a transfer position in a sheet conveying direction. The pair of registration rollers cause the sheet to stand by before the transfer position and corrects skew or lateral displacement of the sheet, and furthermore, the pair of registration rollers feeds the sheet to the transfer position in time with an image forming operation.

SUMMARY

An image forming apparatus of the present disclosure transfers an image onto a surface of a sheet at a transfer position on a conveying path. The image forming apparatus includes a pair of conveying rollers, an image sensor, and a rotary body. The pair of conveying rollers conveys the sheet to the transfer position. The image sensor reads the sheet upstream of the transfer position. The rotary body is disposed to face the image sensor with the conveying path interposed therebetween. The rotary body includes a background portion configured to face a reading surface of the image sensor when the rotary body is at a first rotational position, and a cleaning portion configured to come into contact with the reading surface of the image sensor when the rotary body is at a second rotational position.

For example, in the image forming apparatus, the rotary body is held at the first rotational position when a print job is being executed, and the rotary body rotates when the print job is not being executed.

For example, the image forming apparatus includes a control device configured to process an output signal of the image sensor. In this case, the control device detects a conveying state of the sheet by processing the output signal of the image sensor and executes a process of detecting foreign matter on the reading surface of the image sensor. When the foreign matter is detected, the rotary body rotates when the print job is not being executed.

For example, the image forming apparatus includes a transmission mechanism configured to transmit power to the pair of conveying rollers and the rotary body, and a drive source configured to output power of forward rotation and reverse rotation to the transmission mechanism. In this case, when the print job is being executed, the drive source outputs the power of forward rotation to the transmission mechanism, and the transmission mechanism interrupts transmission of the power of forward rotation to the rotary body. When the print job is not being executed, the drive source outputs the power of reverse rotation to the transmission mechanism, and the transmission mechanism transmits the power of reverse rotation to the rotary body.

For example, in the image forming apparatus, the transmission mechanism is connected to the rotary body via a one-way clutch. In this case, the one-way clutch interrupts transmission of the power of forward rotation to the rotary body and transmits the power of reverse rotation to the rotary body.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
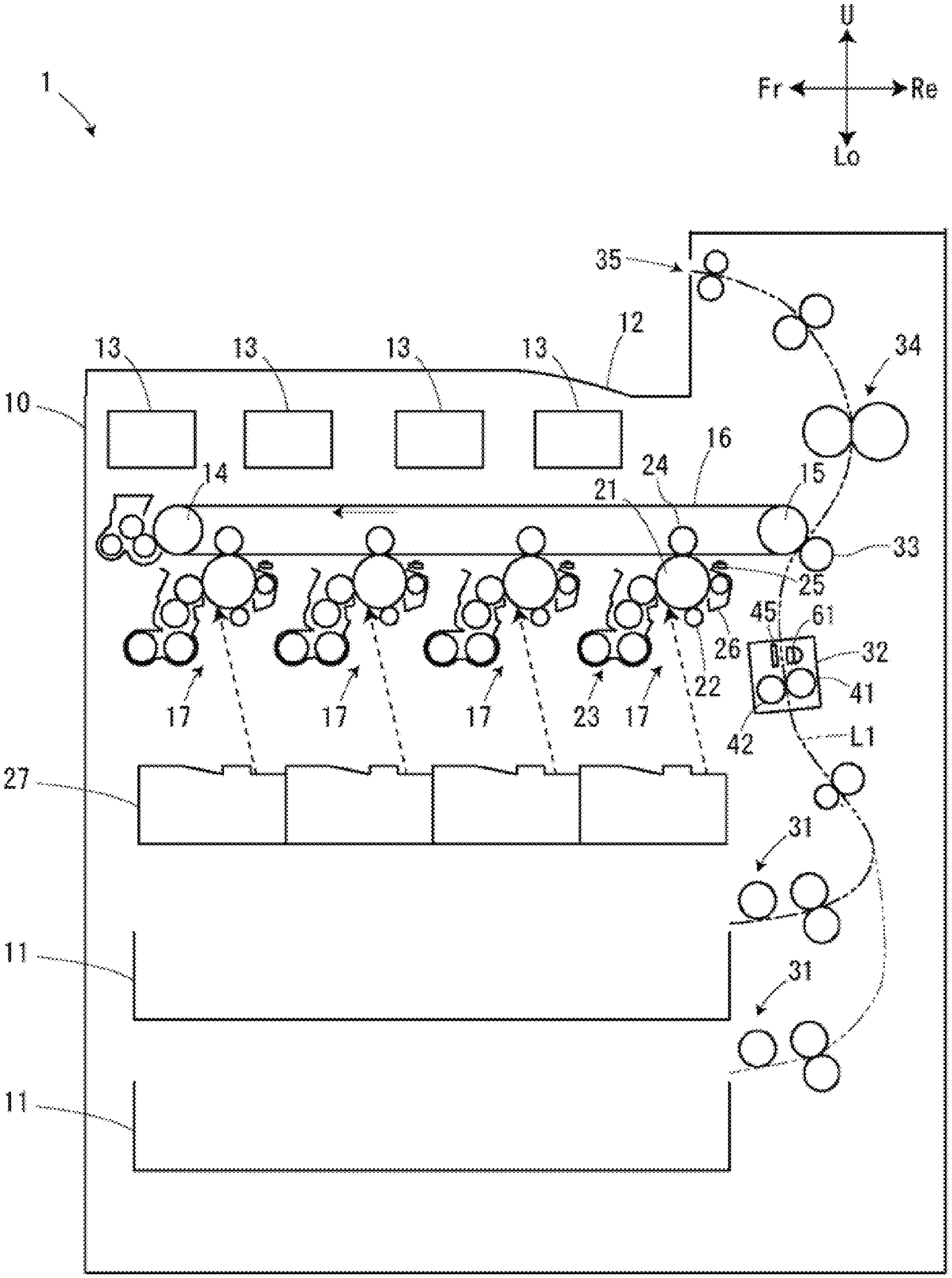
FIG. 1 shows a configuration of a printer according to the present embodiment.

Hereinafter, the present embodiment will be described with reference to the drawings. It is noted that, in the following description, a printer 1 is shown as an example of the image forming apparatus. In FIG. 1, arrows Fr, Re, U, and Lo indicate the front side, the rear side, the upper side, and the lower side of the printer, respectively.

As shown in FIG. 1, the printer 1 includes a box-shaped housing 10 in which various devices are housed. A plurality of sheet feed cassettes 11 in which sheet stacks are respectively set are housed in a lower portion of the housing 10. A sheet discharge tray 12 for stacking sheets on which images have been formed is provided at the top of the housing 10.

A plurality of toner containers 13 each containing toner are detachably set below the sheet discharge tray 12 in the housing 10. The toner containers 13 are provided for a plurality of toner colors, respectively. The plurality of toner colors are, for example, four colors of magenta, cyan, yellow, and black.

An intermediate transfer belt 16 is provided below the toner containers 13 in the housing 10. The intermediate transfer belt 16 is stretched over a pair of rollers 14 and 15. The intermediate transfer belt 16 rotates following the rotation of the pair of rollers 14 and 15.

A plurality of image forming units 17 are disposed below the intermediate transfer belt 16 in the housing 10. The plurality of image forming units 17 are arranged along the lower end of the intermediate transfer belt 16.

Each image forming unit 17 includes a photoconductor drum 21 that is rotatable and rotates in contact with the intermediate transfer belt 16. In each image forming unit 17, a charger 22, a developer 23, a primary transfer roller 24, a static eliminator 25, and a cleaning device 26 are disposed around the photoconductor drum 21 in order of the primary transfer process.

The cleaning device 26 is connected to a waste toner box (not shown). An exposure unit 27 is provided below each image forming unit 17 in the housing 10. The exposure unit 27 is composed of a laser scanning unit (LSU).

In a side portion of the housing 10, a conveying path L1 is formed from each sheet feed cassette 11 toward the sheet discharge tray 12. A plurality of rollers convey a sheet along the conveying path L1. A sheet feed portion 31 is provided upstream of the conveying path L1. In the present embodiment, the sheet feed portion 31 is provided under the conveying path L1.

A registration unit 32 is provided downstream of the sheet feed portion 31 on the conveying path L1. A secondary transfer roller 33 is provided at a side end of the intermediate transfer belt 16. The secondary transfer roller 33 is provided downstream of the registration unit 32 on the conveying path L1.

A fixing device 34 is provided downstream of the secondary transfer roller 33 on the conveying path L1. A sheet discharge port 35 is formed at a downstream end of the conveying path L1.

When the printer 1 forms an image, the charger 22 charges the surface of the photoconductor drum 21, and the exposure unit 27 forms an electrostatic latent image on the surface of the photoconductor drum 21 with laser light.

Next, the developer 23 supplies toner to the electrostatic latent image on the surface of the photoconductor drum 21 to form a toner image. The toner image is transferred from the surface of the photoconductor drum 21 to the surface of the intermediate transfer belt 16 (primary transfer).

At the respective image forming units 17, the toner images of the respective colors are transferred to the intermediate transfer belt 16, whereby a full-color toner image is formed on the surface of the intermediate transfer belt 16. The charge and waste toner remaining on the photoconductor drum 21 are removed by the static eliminator 25 and the cleaning device 26.

Meanwhile, the sheet feed portion 31 supplies a sheet from the sheet feed cassette 11 to the conveying path L1, and the registration unit 32 conveys the sheet toward the secondary transfer roller 33.

The secondary transfer roller 33 transfers the full-color toner image from the surface of the intermediate transfer belt 16 to the surface of the sheet at a transfer position on the conveying path L1 (secondary transfer). The transfer position is the position of the secondary transfer.

The secondary transfer roller 33 also conveys the sheet on which the toner image has been transferred to a fixing device 34 disposed downstream of the secondary transfer roller 33.

The fixing device 34 fixes the toner image on the sheet. The sheet on which the toner image has been fixed is discharged from the sheet discharge port 35 onto the sheet discharge tray 12. As described above, the toner image is transferred to the sheet, and further, an image is formed on the sheet as the sheet passes through the fixing device 34.

By the way, the registration unit 32 includes, in addition to the pair of registration rollers 41 and 42, an image sensor 45 for detecting lateral displacement of the sheet. The pair of registration rollers 41 and 42 is an example of the pair of conveying rollers.

A sheet edge is detected based on the output signal of the image sensor 45, and the lateral displacement is the displacement of the position of the sheet edge with respect to the reference coordinates. The reading surface of the image sensor 45 is a glass surface.

Attachment of foreign matter to the reading surface of the image sensor 45 causes erroneous detection of the sheet edge. It is desirable that the reading surface of the image sensor 45 be cleaned periodically. Therefore, it is desirable that a cleaning member be installed to remove foreign matter such as paper dust from the reading surface of the image sensor 45.

However, it is the background of the sheet that faces the image sensor 45. Therefore, it is difficult to install the cleaning member to face the image sensor 45.

Specifically, a black background member is disposed at a position facing the reading surface of the image sensor 45 in order to facilitate detection of the sheet edge. Therefore, it is difficult to secure a space for disposing the cleaning member at a position facing the reading surface of the image sensor 45.

In the present embodiment, the printer 1 includes a rotary body 61 disposed to face the image sensor 45.

Referring to FIG. 2 to FIG. 7, the registration unit 32 mounted on the printer 1 will be described.

Figure 2:
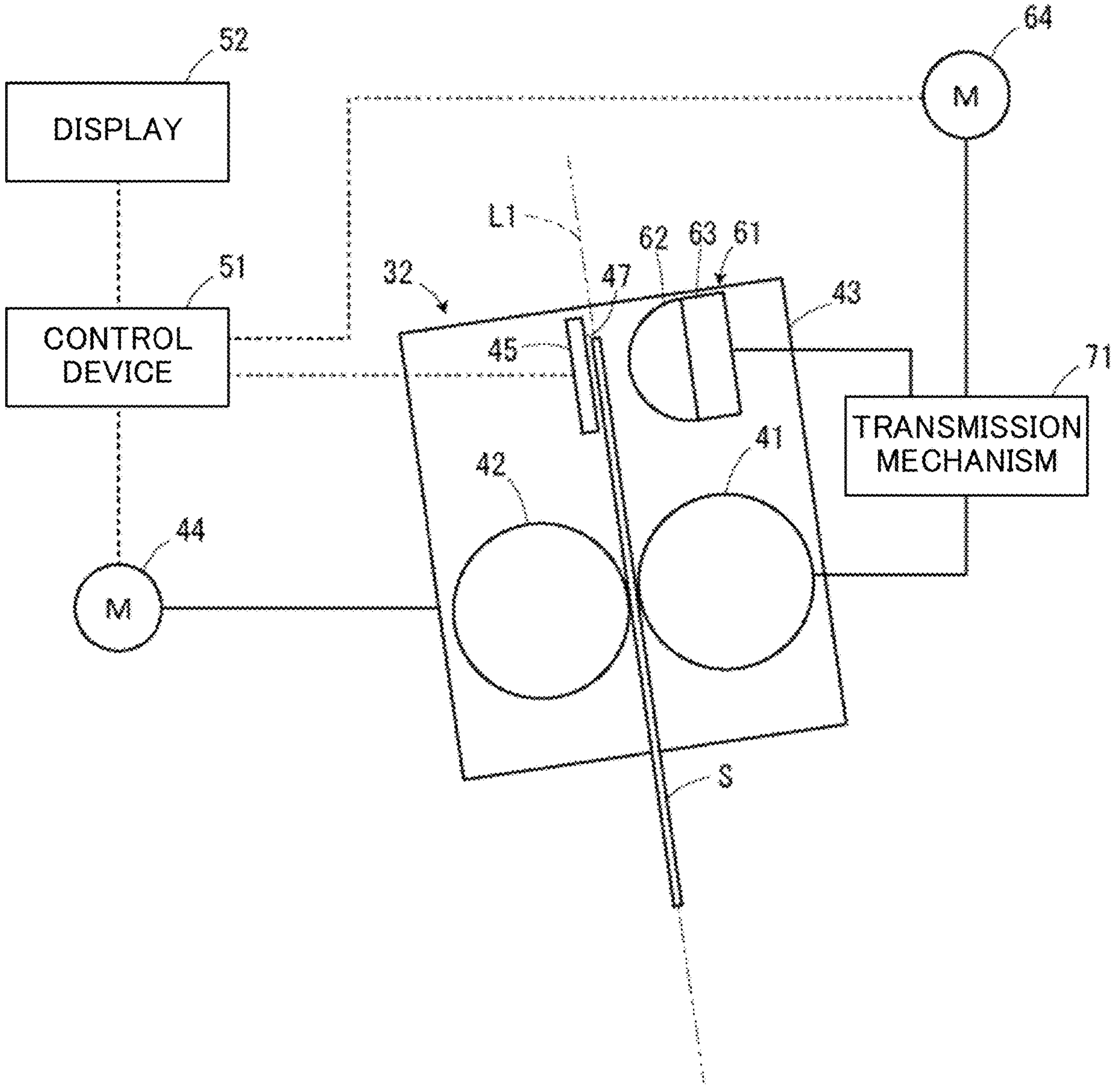
FIG. 2 shows a configuration of devices related to cleaning processing in the printer according to the present embodiment.

As shown in FIG. 2, the registration unit 32 includes the pair of registration rollers 41 and 42 disposed on the conveying path L1. The conveying path L1 is a path along which a sheet S is conveyed and passes between the pair of registration rollers 41 and 42.

The skew of the sheet S is corrected when the leading end of the sheet S abuts against the pair of registration rollers 41 and 42 that are stopped. The pair of registration rollers 41 and 42 correct the skew of the sheet S before the transfer position. The pair of registration rollers 41 and 42 nips the sheet S by rotating.

A unit case 43 supports the pair of registration rollers 41 and 42. As the unit case 43 moves laterally, the lateral displacement of the sheet S nipped between the pair of registration rollers 41 and 42 is corrected.

The pair of registration rollers 41 and 42 conveys the sheet S to the transfer position while correcting the lateral displacement of the sheet S.

The image sensor 45 and the rotary body 61 are disposed downstream of the pair of registration rollers 41 and 42 and upstream of the secondary transfer position on the conveying path L1. The image sensor 45 and the rotary body 61 are disposed to face each other with the conveying path L1 interposed therebetween.

For example, a contact image sensor (CIS) is employed as the image sensor 45. The image sensor 45 and the rotary body 61 are formed to extend in a conveying width direction. The conveying width direction is a direction that intersects the conveying direction of the sheet S. The conveying width direction is a direction perpendicular to the sheet surface in FIG. 2. The rotary body 61 is disposed to face the reading surface 47 of the image sensor 45.

The rotary body 61 includes a background portion 62 and a cleaning portion 63. The background portion 62 faces the reading surface 47 of the image sensor 45 when the rotary body 61 is at a first rotational position. The cleaning portion 63 comes into contact with the reading surface 47 of the image sensor 45 when the rotary body 61 is at a second rotational position. The first rotational position and the second rotational position are phases in the rotation of the rotary body 61, respectively.

When a print job is executed, the rotary body 61 is held at the first rotational position. Thus, the background portion 62 of the rotary body 61 is held at a position facing the reading surface 47 of the image sensor 45. The background portion 62 is colored black. Therefore, the contrast between the white sheet S and the background portion 62 is clear.

Detection light is emitted from the image sensor 45. When the sheet S is not being conveyed, the detection light is absorbed by the black background portion 62. When the sheet S enters between the reading surface 47 of the image sensor 45 and the background portion 62, the detection light is reflected by the white surface of the sheet S, and the reflected light is received by the image sensor 45. Thus, the sheet S is read by the image sensor 45.

When the print job is not being executed, the rotary body 61 rotates. Thus, the cleaning portion 63 of the rotary body 61 comes into contact with the reading surface 47 of the image sensor 45 while rotating. The cleaning portion 63 has a plurality of brush bristles planted on the back surface of the background portion 62. The brush bristles remove foreign matter such as paper dust and dirt from the reading surface 47 of the image sensor 45.

The employment of the rotary body 61 allows the background portion 62 and the cleaning portion 63 to be compactly disposed at a position facing the image sensor 45. In addition, when the print job is being executed, the image sensor 45 can read the sheet S well with the background portion 62 in the background. On the other hand, when the print job is not being executed, the reading surface 47 of the image sensor 45 is cleaned by the cleaning portion 63.

As described above, foreign matter may be attached to the reading surface 47 of the image sensor 45. The detection light emitted by the image sensor 45 passes through a portion of the reading surface 47 where no foreign matter is attached, and is applied to the sheet S and the background portion 62.

On the other hand, part of the detection light is reflected by the foreign matter attached to the reading surface 47 and is received by the image sensor 45. Therefore, when the sheet S is not being conveyed, the foreign matter is detected in the output signal of the image sensor 45.

The output signal of the image sensor 45 is processed by a control device 51. When the sheet S is being conveyed, the control device 51 detects the coordinates of the sheet edge from the output signal of the image sensor 45.

Further, the control device 51 calculates the difference between the detected coordinates of the sheet edge and reference coordinates as the lateral displacement amount of the sheet S. The detected coordinates of the sheet edge when there is no lateral displacement of the sheet S are set as the reference coordinates.

In addition, the control device 51 detects foreign matter on the reading surface 47 of the image sensor 45 from the waveform of the output signal of the image sensor 45. When the foreign matter is detected, the control device 51 rotates the rotary body 61, thereby causing the cleaning portion 63 to clean the reading surface 47 of the image sensor 45.

The control device 51 is electrically connected to a correction motor 44. After calculating the lateral displacement amount of the sheet S, the control device 51 operates the correction motor 44 in accordance with the lateral displacement amount. The correction motor 44 corrects the lateral displacement of the sheet S by moving the unit case 43.

In addition, the control device 51 is electrically connected to the registration motor 64. The registration motor 64 is a drive source that rotates the pair of registration rollers 41 and 42. The registration motor 64 is connected to a registration roller 41 and the rotary body 61 via a transmission mechanism 71.

When the registration motor 64 rotates forward, the transmission mechanism 71 transmits the power of the registration motor 64 to the pair of registration rollers 41 and 42, but not to the rotary body 61. On the other hand, when the registration motor 64 rotates in reverse, the transmission mechanism 71 transmits the power of the registration motor 64 to both the pair of registration rollers 41 and 42 and the rotary body 61.

The control device 51 is electrically connected to a display 52. The display 52 displays various kinds of information related to the operation of image formation on the sheet S. When uncleanable foreign matter is attached to the reading surface 47 of the image sensor 45, the control device 51 outputs a notification signal to the display 52.

The display 52 displays information including a message prompting for confirmation of the reading surface 47 in accordance with the notification signal. This message prompts the operator to confirm the reading surface 47 of the image sensor 45 and remove the foreign matter.

It is noted that the control device 51 may be realized by software using a processor, or may be realized by hardware such as a logic circuit formed in an integrated circuit or the like. When the processor is employed, the processor reads and executes programs stored in a memory to perform various types of processing.

For example, a central processing unit (CPU) is employed as the processor. The memory is composed of one or more storage devices including a read only memory (ROM), a random access memory (RAM), or the like depending on the application.

Figure 3:
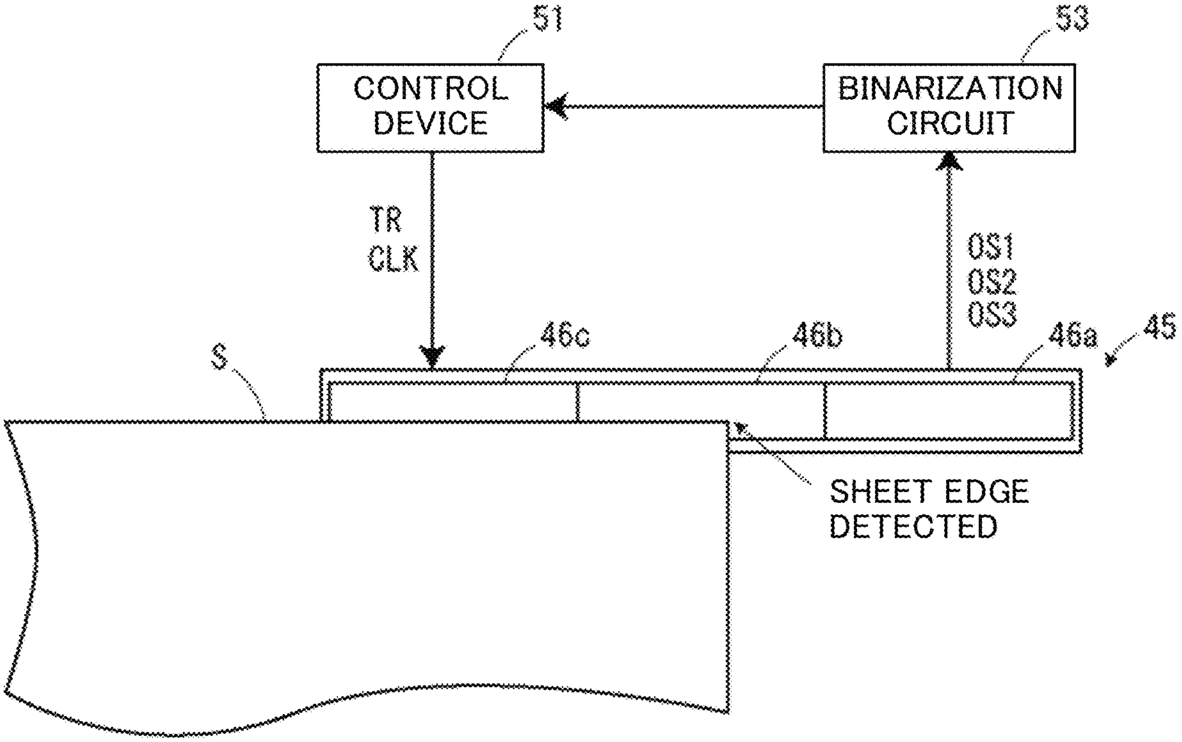
FIG. 3 shows a configuration related to control of an image sensor in the printer according to the present embodiment.

As shown in FIG. 3, the image sensor 45 is installed so as to be biased in the width direction with respect to the passage area of the sheet S. The reading surface 47 of the image sensor 45 is divided into first to third detection blocks *46a* to *46c*.

The first to third detection blocks *46a* to *46c* each include a plurality of photoelectric conversion elements arranged in a line in the conveying width direction. A trigger signal and a clock signal output from the control device 51 are input to the image sensor 45. The first to third detection blocks *46a* to *46c* start image reading in synchronization with the trigger signal.

The detection light emitted from the light source is reflected by the sheet S and the foreign matter, and the reflected light is received by the plurality of photoelectric conversion elements in each of the first to third detection blocks *46a* to *46c*. In each of the first to third detection blocks *46a* to *46c*, each of the plurality of photoelectric conversion elements outputs a pixel signal representing the received light amount of the reflected light.

The first to third detection blocks 46*a* to 46*c* output an analog signal including the pixel signal for each pixel to a binarization circuit 53 in synchronization with the clock signal.

The binarization circuit 53 converts the analog signal into a digital signal and outputs the digital signal to the control device 51 as an output signal of the image sensor 45. In this manner, the image sensor 45 outputs an output signal including a detection signal of the reflected light from the sheet S and the foreign matter to the control device 51 via the binarization circuit 53.

Figure 4:
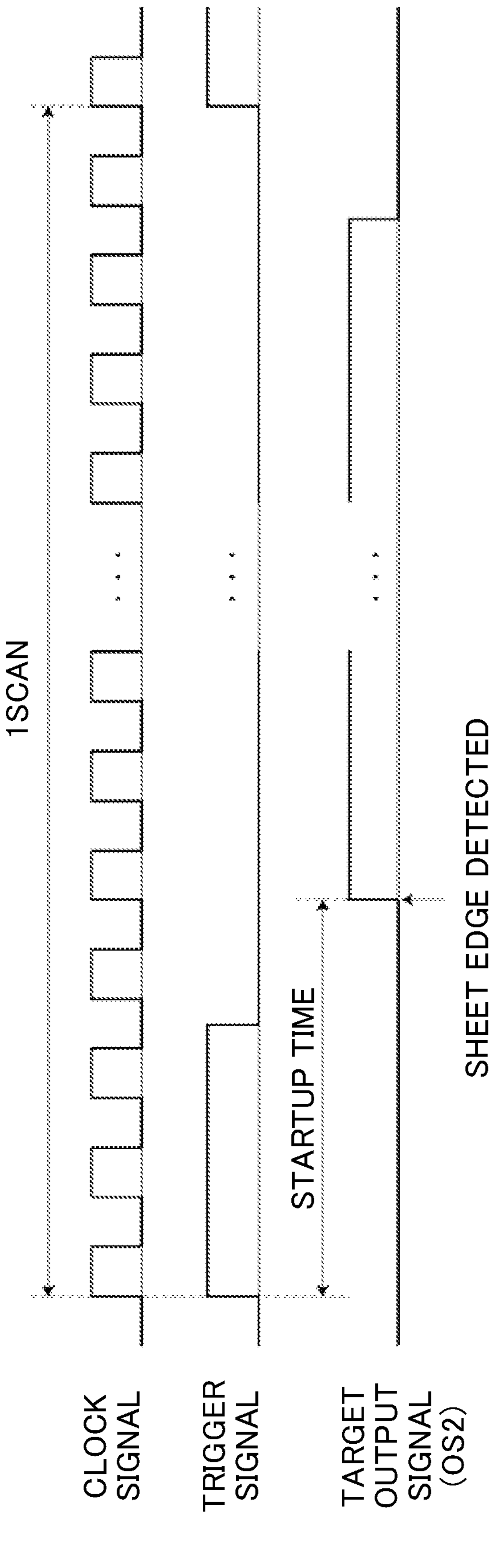
FIG. 4 is a timing chart of signals related to detection of a sheet edge in the printer according to the present embodiment.

In FIG. 4, the period from a point when one trigger signal is input to a point when the next trigger signal is input is the period of one scan. The output signal of the image sensor 45 is output in synchronization with the clock signal at a timing delayed by a predetermined startup time relative to the clock signal.

A target output signal OS2 used to detect the lateral displacement of the sheet S is selected from the output signals of the first to third detection blocks 46*a* to 46*c* in accordance with the size of the sheet S. The target output signal OS2 is a signal output from one of the first to third detection blocks 46*a* to 46*c* disposed in the area through which the sheet edge of the sheet S passes.

For example, when the size of the sheet S is A4 size, the output signal of the second detection block 46*b* is used as the target output signal OS2. The control device 51 detects the coordinates of the sheet edge in accordance with the number of clocks in the period from the rising edge of the trigger signal to the rising edge of the target output signal OS2. The number of clocks is the number of clock signals. Further, the control device 51 derives the lateral displacement amount of the sheet S in accordance with the difference of the detected coordinates of the sheet edge with respect to reference coordinates. The reference coordinates are set in advance in accordance with the size of the sheet S.

Figure 5:
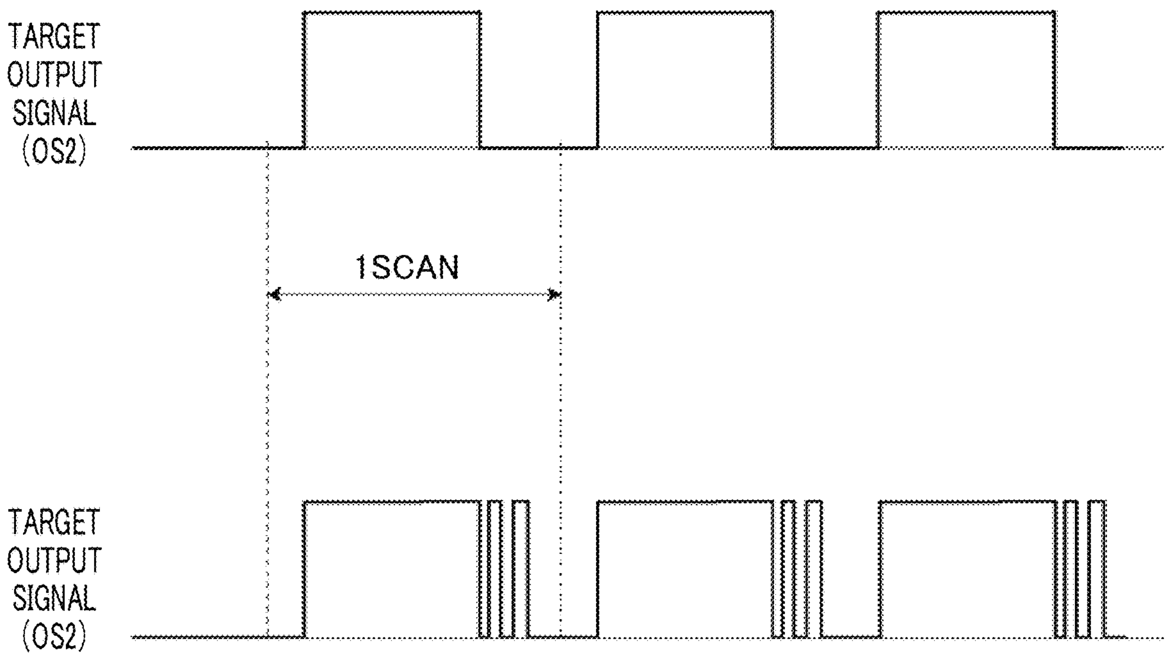
FIG. 5 is an example of an output signal of a specific detection block of the image sensor when a sheet is being conveyed in the printer according to the present embodiment.

As shown in FIG. 5, when the print job is being executed, the image sensor 45 outputs a target output signal OS2 corresponding to the reflected light from the sheet S and the foreign matter.

The upper time chart in FIG. 5 shows an example of the target output signal OS2 when the sheet S is being conveyed in a state where no foreign matter is attached to the reading surface 47 of the image sensor 45. In this case, the target output signal OS2 includes one rising edge or one falling edge in one scan.

The lower time chart in FIG. 5 shows an example of the target output signal OS2 when the sheet S is being conveyed in a state where foreign matter is attached to the reading surface 47 of the image sensor 45. In this case, the target output signal OS2 includes a plurality of rising edges or a plurality of falling edges in one scan.

Figure 6:
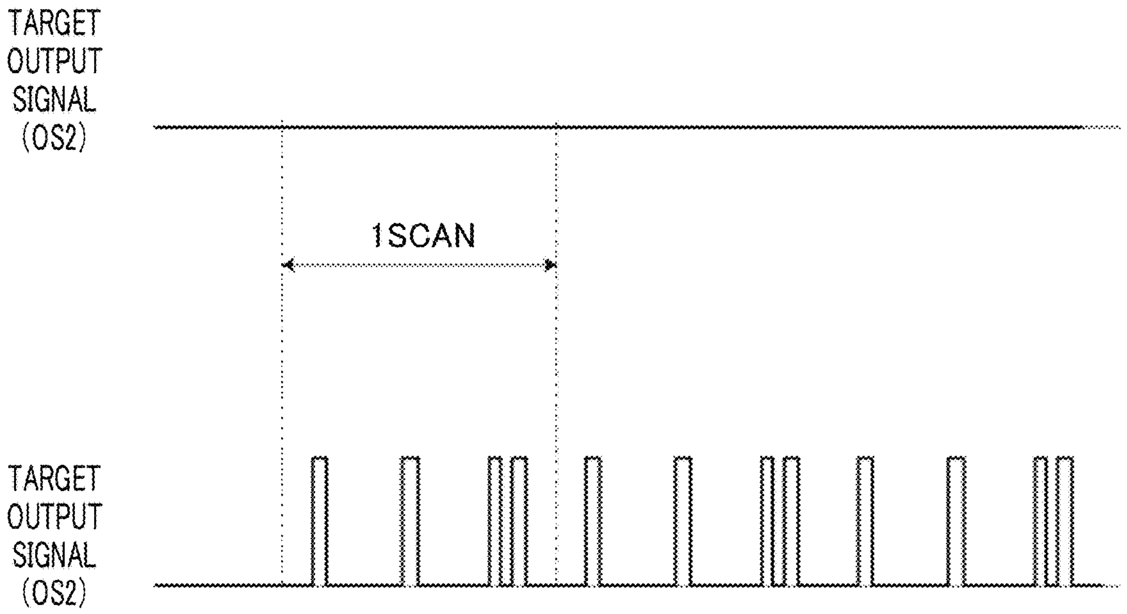
FIG. 6 is an example of an output signal of a specific detection block of the image sensor when no sheet is being conveyed in the printer according to the present embodiment.

As shown in FIG. 6, when the print job is not being executed, the image sensor 45 outputs a target output signal OS2 corresponding to the presence or absence of foreign matter on the reading surface 47. For example, the situation where the print job is not being executed is a situation where the power has been turned on, a situation where the printer 1 has returned from the sleep state, a situation where the printer 1 is in standby, or a situation immediately after some covers of the printer 1 have been opened or closed.

The upper time chart in FIG. 6 shows the target output signal OS2 when the sheet S is not being conveyed in a state where no foreign matter is attached to the reading surface 47 of the image sensor 45. In this case, the target output signal OS2 includes no rising edge and no falling edge in one scan.

The lower time chart in FIG. 6 shows the target output signal OS2 when the sheet S is not being conveyed in a state where foreign matter is attached to the reading surface 47 of the image sensor 45. In this case, the target output signal OS2 includes at least one rising edge or at least one falling edge in one scan.

When the print job is being executed, the control device 51 does not detect foreign matter on the reading surface 47 if the target output signal OS2 includes only one rising edge or one falling edge in one scan.

When the print job is being executed, the control device 51 detects foreign matter on the reading surface 47 if the target output signal OS2 includes a plurality of rising edges or a plurality of falling edges in one scan.

When the print job is not being executed, the control device 51 does not detect foreign matter on the reading surface 47 if the target output signal OS2 includes no rising edge and no falling edge in one scan.

When the print job is not being executed, the control device 51 detects foreign matter on the reading surface 47 if the target output signal OS2 includes at least one rising edge or at least one falling edge in one scan. The control device 51 may derive the foreign matter size in accordance with the number of clocks in the period from the rising edge to the falling edge of the target output signal OS2 in one scan.

If the foreign matter is detected when the print job is being executed, the control device 51 rotates the rotary body 61 at a pause timing. Thus, the cleaning portion 63 cleans the reading surface 47 of the image sensor 45.

The pause timing is a timing at which the print job is finished or a timing at which the print job is interrupted due to calibration or the like. The pause timing is a timing at which the print job is not executed.

When the foreign matter is detected while the print job is not being executed, the control device 51 rotates the rotary body 61 before the next print job is started. Thus, the cleaning portion 63 cleans the reading surface 47 of the image sensor 45.

As described above, when foreign matter is detected on the reading surface 47 of the image sensor 45, the rotary body 61 rotates when the print job is not being executed. Thus, the cleaning portion 63 removes the foreign matter from the reading surface 47 of the image sensor 45.

Figure 7A:
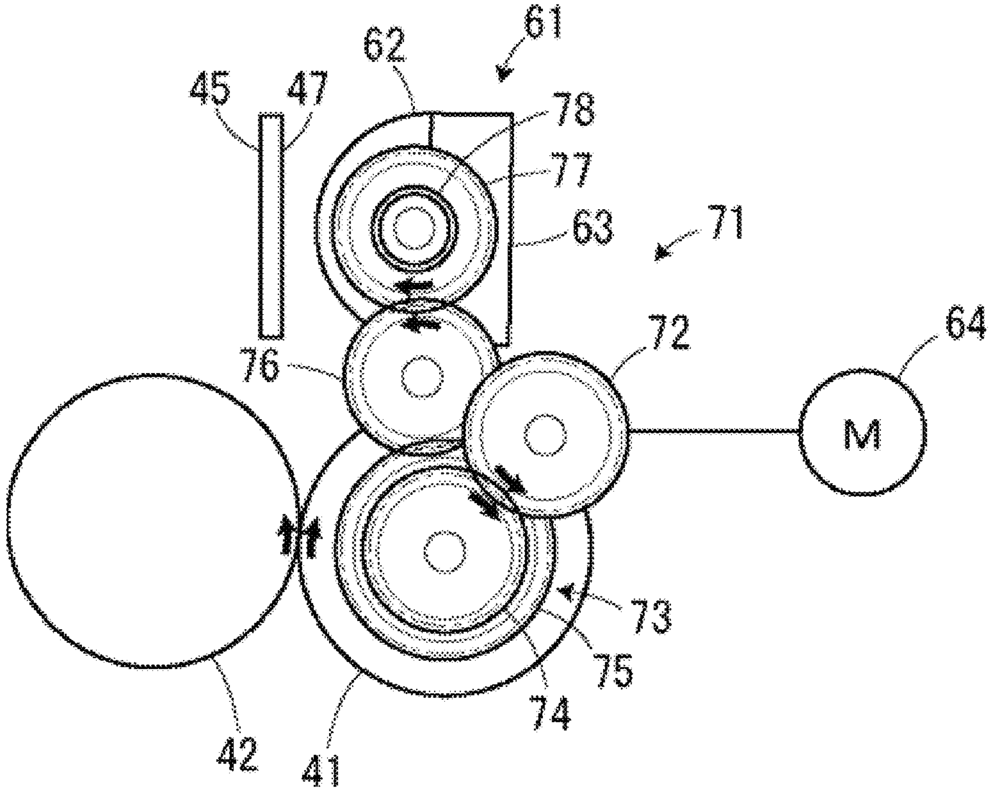
FIG. 7A shows a transmission operation of power of a registration motor that rotates forward in the printer according to the present embodiment.

As shown in FIG. 7A, the printer 1 includes the transmission mechanism 71 that transmits power to the pair of registration rollers 41 and 42 and the rotary body 61. The transmission mechanism 71 is provided on one side surface of the unit case 43 of the registration unit 32 (see FIG. 2).

The registration motor 64 outputs power of forward rotation or power of reverse rotation to an input gear 72 of the transmission mechanism 71. The input gear 72 is connected to a small-diameter gear 74 of a registration gear 73. The registration gear 73 is fixed to the rotation shaft of the registration roller 41.

The registration roller 42 has an outer peripheral surface made of rubber. The registration roller 42 is rotatably supported. The outer peripheral surface of the registration roller 42 is in contact with the registration roller 41. A large-diameter gear 75 of the registration gear 73 is connected to a clutch gear 77 via an intermediate gear 76.

The clutch gear 77 is connected to the rotation shaft of the rotary body 61 via a one-way clutch 78. That is, the transmission mechanism 71 is connected to the rotary body 61 via the one-way clutch 78.

When the registration motor 64 rotates forward, the one-way clutch 78 interrupts the transmission of power from the registration motor 64 to the rotary body 61. When the registration motor 64 rotates in reverse, the one-way clutch 78 transmits power from the registration motor 64 to the rotary body 61.

The direction of the forward rotation of the registration motor 64 is the rotational direction when the sheet is conveyed toward the transfer position by the registration rollers 41 and 42. The direction of the reverse rotation of the registration motor 64 is the rotational direction opposite to the direction of the forward rotation.

When the printer 1 executes the print job, the registration motor 64 outputs power of forward rotation to the input gear 72 of the transmission mechanism 71. The transmission mechanism 71 transmits the power of forward rotation from the input gear 72 to the registration gear 73, and the registration roller 41 rotates together with the registration gear 73. The registration roller 42 rotates following the rotation of the registration roller 41. Thus, the sheet nipped between the pair of registration rollers 41 and 42 is conveyed toward the transfer position.

In addition, the registration gear 73 transmits the power of forward rotation to the clutch gear 77 via the intermediate gear 76, but the one-way clutch 78 does not transmit the power of forward rotation to the rotary body 61. Thus, the clutch gear 77 runs idle, the rotary body 61 is held at the first rotational position, and the background portion 62 is held in a state of facing the reading surface 47 of the image sensor 45.

When the sheet passes between the image sensor 45 and the background portion 62, the sheet is read by the image sensor 45 well. Since the rotary body 61 does not rotate while the print job is being executed, it is possible to prevent the cleaning portion 63 from hindering the conveyance of the sheet.

Figure 7B:
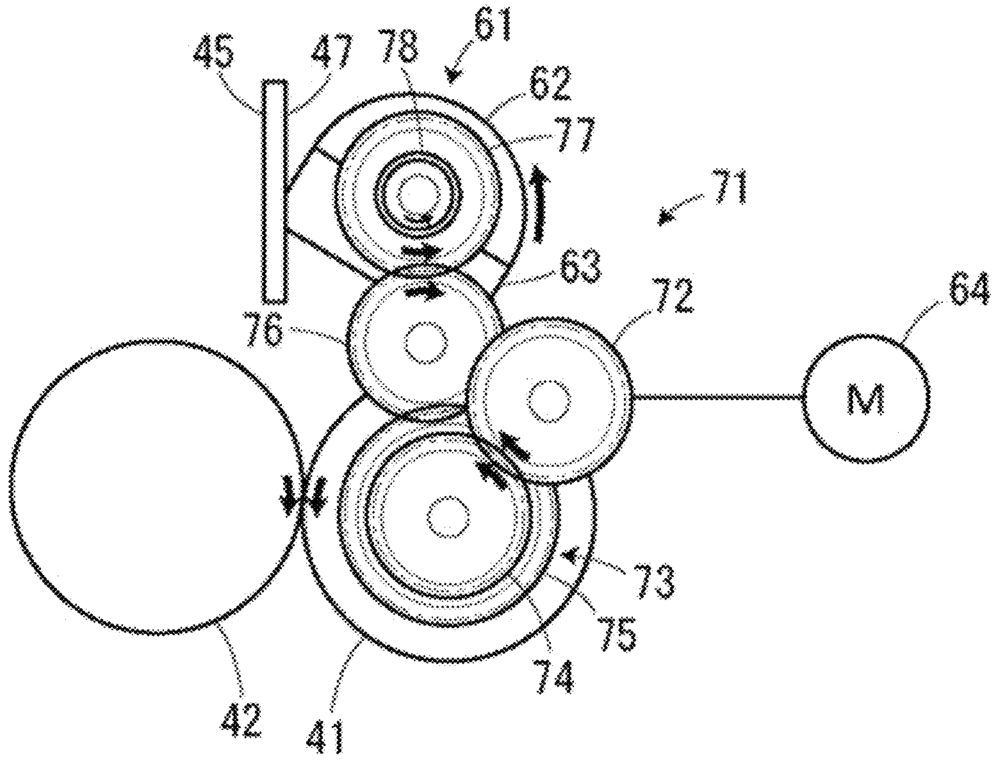
FIG. 7B shows a transmission operation of power of a registration motor that rotates in reverse in the printer according to the present embodiment.

FIG. 7B shows an operation state of the transmission mechanism 71 and the like when foreign matter on the reading surface 47 of the image sensor 45 is detected by the control device 51. As shown in FIG. 7B, when the print job is not being executed, the registration motor 64 outputs the power of reverse rotation to the input gear 72 of the transmission mechanism 71.

The input gear 72 transmits the power of reverse rotation to the registration gear 73, and the registration roller 41 rotates in reverse together with the registration gear 73. The registration roller 42 also rotates following the reverse rotation of the registration roller 41. At this time, the print job is not being executed; therefore, the registration rollers 41 and 42 do not convey the sheet in reverse on the conveying path L.

In addition, the registration gear 73 transmits the power of reverse rotation to the clutch gear 77 via the intermediate gear 76, and the one-way clutch 78 transmits the power of reverse rotation to the rotary body 61. The rotary body 61 receives the power of reverse rotation and rotates together with the clutch gear 77, and the cleaning portion 63 of the rotary body 61 comes into contact with the reading surface 47 of the image sensor 45 while rotating.

The cleaning portion 63 removes the foreign matter from the reading surface 47 of the image sensor 45, thereby preventing erroneous detection of the lateral displacement amount of the sheet when the print job is executed. As described above, the forward rotation and reverse rotation of the single registration motor 64 can be used to rotate the pair of conveying rollers 41 and 42 and the rotary body 61 as needed.

Figure 8:
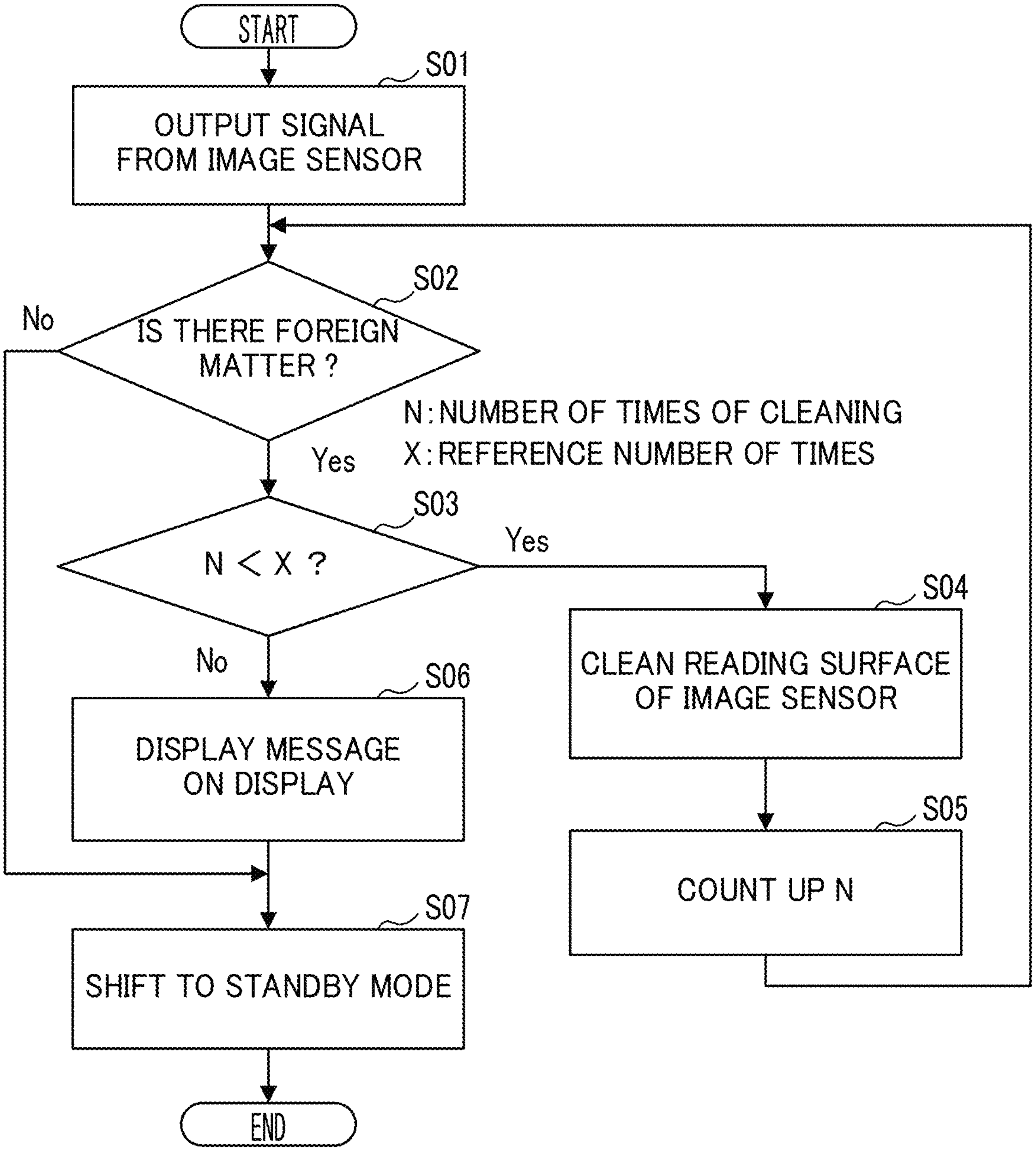
FIG. 8 is a flowchart showing an example of the procedure of the cleaning processing in the printer according to the present embodiment.

Cleaning processing will be described with reference to FIG. 8. FIG. 8 is a flowchart showing an example of the procedure of the cleaning processing. It is noted that the description will be provided here using the reference numerals shown in FIG. 2 as appropriate. In addition, the following flowchart is merely an example and may be modified as appropriate. In addition, in the example shown below, foreign matter is detected when the print job is not being executed, but foreign matter may be detected when the print job is being executed.

As shown in FIG. 8, after the print job is completed, the image sensor 45 outputs a signal to the control device 51 (step S01).

The control device 51 determines whether or not there is foreign matter on the reading surface 47 of the image sensor 45 based on the output signal of the image sensor 45 (step S02). For example, the control device 51 determines the presence or absence of the foreign matter based on the number of rising edges in one scan in the output signal.

When it is determined that there is no foreign substance (No in step S02), the printer 1 shifts to a standby mode until the next print job (step S07).

When it is determined that there is foreign matter (Yes in step S02), the control device 51 compares the number of times of cleaning N with a reference number of times X (step S03). The number of times of cleaning N is the number of times of cleaning of the reading surface 47 of the image sensor 45, and is counted by the control device 51.

When the number of times of cleaning N is less than the reference number of times X (Yes in step S03), the control device 51 operates the registration motor 64 so that the reading surface 47 of the image sensor 45 is cleaned (step S04). In this case, the cleaning portion 63 cleans the reading surface 47 of the image sensor 45 with the power of reverse rotation of the registration motor 64. Then, the control device 51 counts up the number of times of cleaning N (step S05), and the process proceeds to step S02.

On the other hand, when the number of times of cleaning N is equal to or greater than the reference number of times X (No in step S03), the control device 51 causes the display 52 to display a message (step S06). The message prompts the user to confirm the reading surface 47 of the image sensor 45. Thus, the foreign matter that could not be removed by the cleaning portion 63 is manually removed from the reading surface 47 of the image sensor 45. Then, the printer 1 shifts to the standby mode until the next print job (step S07).

In the standby mode, the rotary body 61 is held in a state in which the background portion 62 faces the reading surface 47 of the image sensor 45. It is noted that the reference number of times X is a variable that can be set to any value.

In addition, when it is determined that there is no foreign matter (No in step S02) or when the message is displayed on the display 52 (step S06), the control device 51 resets the number of times of cleaning N to 0.

As described above, according to the present embodiment, the background portion 62 of the rotary body 61 is directed to the reading surface 47 of the image sensor 45, which allows the sheet to be read well. Further, as the rotary body 61 rotates as needed, the reading surface 47 of the image sensor 45 is cleaned by the cleaning portion 63.

Since the background portion 62 and the cleaning portion 63 are formed in the rotary body 61, the background portion 62 and the cleaning portion 63 can be compactly disposed at a position facing the reading surface 47 of the image sensor 45 with a simple configuration. That is, the background portion 62 and the cleaning portion 63 can be compactly provided without increasing the size of the printer 1.

Although the image sensor 45 is installed downstream of the pair of registration rollers 41 and 42 in the present embodiment, the image sensor 45 may be installed upstream of the pair of registration rollers 41 and 42.

In the above case, the coordinates of the front end of the sheet may be detected from the output signal of the image sensor 45, and the skew of the sheet may be detected based on the coordinates of the front end of the sheet. For example, the control device 51 detects the timings at which the front end of the sheet passes two locations on the left and right of the image sensor 45, and derives the skew of the sheet according to the difference in timing between the two locations.

Although the CIS is exemplified as the image sensor 45 in the present embodiment, other image sensors such as a charge couple device (CCD) sensor may be used.

In addition, in the present embodiment, the pair of registration rollers 41 and 42 is exemplified as the pair of conveying rollers that convey the sheet to the transfer position, but a pair of registrationless rollers may be used. That is, the image forming apparatus may include a registrationless unit instead of the registration unit 32.

In addition, in the present embodiment, the lateral displacement of the sheet is detected based on the output signal of the image sensor 45. However, another sheet conveying state, such as sheet skew or sheet conveying timing deviation, may be optically detected based on the output signal of the image sensor 45.

For example, the deviation of the conveying timing is detected as the difference between the time from when the sheet passes the upstream sensor of the pair of registration rollers 41 and 42 to when the sheet passes the image sensor 45 and the reference time.

In addition, in the present embodiment, the control device 51 of the apparatus main body processes the output signal of the image sensor 45. However, another control device provided in the registration unit 32 may process the output signal of the image sensor 45.

In addition, in the present embodiment, the transmission mechanism 71 is connected to the rotary body 61 via the one-way clutch 78. However, another mechanism that interrupts the transmission of the power of forward rotation to the rotary body 61 and transmits the power of reverse rotation to the rotary body 61 may be employed as the transmission mechanism 71.

In addition, although the printer 1 is exemplified as the image forming apparatus in the present embodiment, the image forming apparatus is not limited to the printer 1. The image forming apparatus may be a copier, a facsimile machine, or a multifunction machine having multiple functions such as a print function, a copy function, and a fax function.

It is noted that other embodiments in which the above-described embodiment and modifications are wholly or partially combined may be employed.

In addition, the technology of the present disclosure is not limited to the above-described embodiment, and may be changed, substituted, or modified in various ways without departing from the spirit of the technical idea. Further, if the technical idea can be realized in another way through technological advancement or another derived technology, it may be implemented using that method. Therefore, the claims cover all embodiments that may be included within the scope of the technical idea.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus for transferring an image onto a surface of a sheet at a transfer position on a conveying path, comprising:

a pair of conveying rollers configured to convey the sheet to the transfer position;

an image sensor formed to extend in a conveying width direction that intersects a conveying direction of the sheet, including a plurality of photoelectric conversion elements arranged in a line in the conveying width direction, and configured to read the sheet upstream of the transfer position; and a rotary body formed to extend in the conveying width direction and disposed to face the image sensor with the conveying path interposed therebetween, wherein the rotary body includes a background portion configured to face a reading surface of the image sensor when the rotary body is at a first rotational position, and a cleaning portion configured to come into contact with the reading surface of the image sensor when the rotary body is at a second rotational position.

2. The image forming apparatus according to claim 1, wherein the rotary body is held at the first rotational position when a print job is being executed, and the rotary body rotates when the print job is not being executed.

3. The image forming apparatus according to claim 2, further comprising:

a control device configured to process an output signal of the image sensor, wherein the control device detects a conveying state of the sheet by processing the output signal of the image sensor and executes a process of detecting foreign matter on the reading surface of the image sensor, and when the foreign matter is detected, the rotary body rotates when the print job is not being executed.

4. An image forming apparatus for transferring an image onto a surface of a sheet at a transfer position on a conveying path, comprising:

a pair of conveying rollers configured to convey the sheet to the transfer position;

an image sensor configured to read the sheet upstream of the transfer position;

a rotary body disposed to face the image sensor with the conveying path interposed therebetween;

a transmission mechanism configured to transmit power to the pair of conveying rollers and the rotary body; and a drive source configured to output power of forward rotation and reverse rotation to the transmission mechanism, wherein the rotary body includes a background portion configured to face a reading surface of the image sensor when the rotary body is at a first rotational position, and a cleaning portion configured to come into contact with the reading surface of the image sensor when the rotary body is at a second rotational position;

when a print job is being executed, the drive source outputs the power of forward rotation to the transmission mechanism, and the transmission mechanism interrupts transmission of the power of forward rotation to the rotary body, and when the print job is not being executed, the drive source outputs the power of reverse rotation to the transmission mechanism, and the transmission mechanism transmits the power of reverse rotation to the rotary body.

5. The image forming apparatus according to claim 4, wherein the transmission mechanism is connected to the rotary body via a one-way clutch, and the one-way clutch interrupts the transmission of the power of forward rotation to the rotary body and transmits the power of reverse rotation to the rotary body.

* * * * *